United States Patent
Monakova

(10) Patent No.: US 11,288,064 B1
(45) Date of Patent: Mar. 29, 2022

(54) ROBOTIC PROCESS AUTOMATION FOR INTERACTIVE DOCUMENTATION

(71) Applicant: SAP SE, Walldorf (DE)

(72) Inventor: Ganna Monakova, Karlsruhe (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 17/019,788

(22) Filed: Sep. 14, 2020

(51) Int. Cl.
G06F 9/44 (2018.01)
G06F 8/73 (2018.01)
G06F 9/455 (2018.01)
G06F 9/451 (2018.01)

(52) U.S. Cl.
CPC ............... G06F 8/73 (2013.01); G06F 9/453 (2018.02); G06F 9/45512 (2013.01)

(58) Field of Classification Search
None
See application file for complete search history.

(56) References Cited

U.S. PATENT DOCUMENTS

| | | | |
|---|---|---|---|
| 2019/0012390 A1* | 1/2019 | Nishant | G06F 16/248 |
| 2019/0354720 A1* | 11/2019 | Tucker | G06N 5/02 |
| 2020/0233707 A1* | 7/2020 | Ramamurthy | G06F 8/70 |
| 2021/0097274 A1* | 4/2021 | Gligan | G06F 16/93 |
| 2021/0117742 A1* | 4/2021 | Gligan | G06F 16/93 |
| 2021/0141635 A1* | 5/2021 | Thomas | G06F 11/3466 |

OTHER PUBLICATIONS

Telegram, "Introducing Inline Bots," telegram.org, Jan. 4, 2016. (Year: 2016).*

* cited by examiner

*Primary Examiner* — Insun Kang
(74) *Attorney, Agent, or Firm* — Sterne, Kessler, Goldstein & Fox P.L.L.C.

(57) ABSTRACT

Disclosed herein are system, method, and computer program product embodiments for automatically generating electronic documentation, including interactive documentation, using robotic process automation (RPA). An embodiment operates by receiving RPA data associated with an RPA bot. The embodiment further operates by generating modified RPA data based on the RPA data. Subsequently, the embodiment operates by generating electronic documentation data based on the modified RPA data.

17 Claims, 12 Drawing Sheets

FIG. 5D

ROBOTIC PROCESS AUTOMATION FOR INTERACTIVE DOCUMENTATION

BACKGROUND

Modern companies increasingly struggle with onboarding new employees who need to learn new tools and processes. In one example, the people best suited to train new employees and answer their questions are often experts needed by their company to perform non-training corporate activities. Accordingly, many companies maintain expansive collections of documentation and learning materials that describe their computer-implemented processes using different digital tools and applications (e.g., wikis, word processing documents, spreadsheets, presentations, slideshows, diagrams, drawings, email, databases, and so forth). However, existing collections of documentation and learning materials often lack up-to-date information, are costly to maintain (e.g., both to update existing material and to add new material), do not fully capture expert knowledge, and are not rich enough to answer the multitude of different user questions that may arise.

BRIEF DESCRIPTION OF THE DRAWINGS

The accompanying drawings are incorporated herein and form a part of the specification.

FIGS. 5A, 5B, 5C, and 5D are illustrative representations of structured documentation data display screens, according to some embodiments.

In the drawings, like reference numbers generally indicate identical or similar elements. Additionally, generally, the left-most digit(s) of a reference number identifies the drawing in which the reference number first appears.

DETAILED DESCRIPTION

Figure 1:
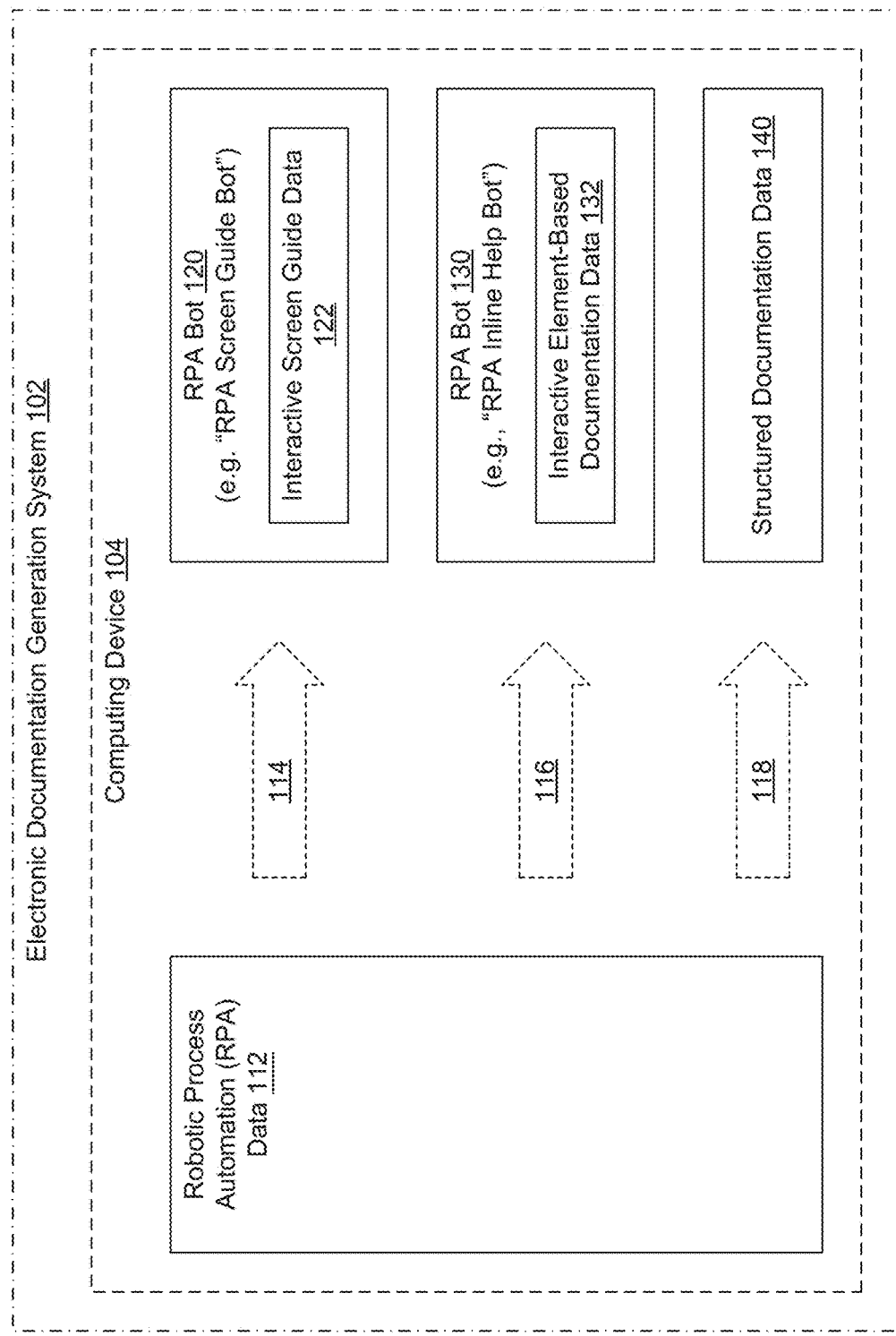
FIG. 1 is a block diagram of an electronic documentation generation system, according to some embodiments.

Provided herein are system, apparatus, device, method and/or computer program product embodiments, and/or combinations and sub-combinations thereof, for automatically generating and delivering electronic documentation, including interactive documentation, based on robotic process automation (RPA) data associated with an RPA bot.

RPA accelerates the digital transformation of computer-implemented processes by automatically replicating human user actions. RPA can be implemented as a complete automation suite where RPA software robots ("RPA bots") are configured to automate various user tasks and parts of computer-implemented processes through application user interfaces (UIs). For example, RPA bots can automate end-to-end scenarios for definable and repeatable computer-implemented processes, including mimicking human user actions by replacing manual clicks. RPA bots can also provide cross-technology UI-based automation and thus can automate user tasks across different applications by simulating user actions in the UI. To do so, RPA bots can recognize and manipulate different applications through their UIs by, for example, identifying UI elements using criteria (e.g., element of type "Button" with identifier (id) "btnOK") and manipulating the identified UI elements through several actions (e.g., performing clicks, inputting textual data).

In one example, RPA bots can contain a wealth of knowledge imparted by human experts about daily user activities and entities' computer-implemented processes. Because these experts know how their entity's computer-implemented processes work and how they should be modeled, they typically only represent a small percentage of the total workforce within any given enterprise. These experts work closely with RPA bot developers to capture their knowledge as an RPA bot that can automate a computer-implemented process.

In another example, a computer-implemented process can be modeled as an RPA bot, either by using a process recorder or an RPA bot software design tool. The computer-implemented process can include a set of functions to be performed by the RPA bot automatically, without user interaction, and across two or more different applications, such as wiki applications, word processing applications, spreadsheet applications, presentation applications, slideshow applications, diagram applications, drawing applications, email applications, database applications, any other suitable applications, or any combinations thereof.

However, there is a need for the experts' knowledge about the computer-implemented process to be shared or captured in a transparent way. Further, modification or testing of the computer-implemented process requires the expertise of both the expert and the RPA bot developer. For example, if a user wants to understand a designed RPA bot, the user would need to install and become familiar with all required software before even starting to investigate the RPA bot specifics. In addition, although most RPA design software offers graphical design tools, RPA bots are still very hard to understand for a non-technical user.

When considering the RPA bot development and sharing community, the wealth of knowledge captured in RPA bots becomes substantial and spans across multiple industries. However, that knowledge typically remains stored in a way that only experts can make use of, critically limiting that knowledge's re-use in different scenarios, optimization of processes, and benchmarking the effectiveness and implementation of process automation against industry best practices.

In contrast, the system, apparatus, device, method and/or computer program product embodiments, and/or combinations and sub-combinations thereof, described herein solve these technological problems by utilizing RPA bot content (e.g., RPA data) to generate (e.g., automatically and without user interaction; or with user interaction) modified RPA bot content for use in providing enhanced computer-implemented processes and documentation, including interactive screen guide data (e.g., interactive screen guides), interactive element-based documentation data (e.g., in-product contextual documentation), and structured documentation data (e.g., offline process documentation). The automatically generated modified RPA content can then be used for, for example: (i) onboarding new users; (ii) generating and delivering learning content through the RPA channels; (iii) generating and delivering "what's new" product updates; (iv) providing in-product contextual help; (v) generating and delivering "live documentation" of productive RPA bots (e.g., published together with the productive RPA bot to explain the automated process); any other suitable applications: or any combination thereof. Further, because RPA bots are capable of listening and reacting to UI events, and in some embodiments, dynamically modifying UIs (e.g., modifying the document object model (DOM) in a web page), RPA bots can deliver interactive UI content that can be dynamically presented to users based on their current context. Thus, RPA bots can also deliver automatically generated interactive documentation to users.

In one illustrative example, the system, apparatus, device, method and/or computer program product embodiments, and/or combinations and sub-combinations thereof, described herein can be configured to generate interactive screen tutorials from an RPA bot and deliver those interactive tutorials using another RPA bot, such as an RPA guide bot, that navigates users through different screens (e.g., as described with reference to RPA bot 120 and interactive screen guide data 122 shown in FIG. 1; and FIGS. 2A, 2B, 3A, and 3B). In another illustrative example, the system, apparatus, device, method and/or computer program product embodiments, and/or combinations and sub-combinations thereof, described herein can be configured to use RPA screen capture data to generate interactive inline product documentation and deliver that interactive documentation using another RPA bot, such as an RPA inline help bot (e.g., as described with reference to RPA bot 130 and interactive element-based documentation data 132 shown in FIG. 1; and FIG. 4). In yet illustrative example, the system, apparatus, device, method and/or computer program product embodiments, and/or combinations and sub-combinations thereof, described herein can be configured to generate structured documentation, such as textual and visual documentation, from an RPA bot and store that documentation locally on a user's computing device for offline access, viewing, and printing (e.g., as described with reference to structured documentation data 140 shown in FIG. 1; and FIGS. 5A, 5B, 5C, and 5D).

There are many exemplary aspects to the system, apparatus, device, method and/or computer program product embodiments, and/or combinations and sub-combinations thereof, disclosed herein. For example, embodiments of the present disclosure provide for automatically generating up-to-date documentation and learning materials that describe entities' computer-implemented processes and applications. In another example, embodiments of the present disclosure substantially reduce the cost of documentation maintenance (e.g., keeping it up-to-date, adding new cases). In another example, embodiments of the present disclosure more fully capture human expert knowledge in automatically generated electronic documentation and learning materials and thus provide for knowledge sharing from human experts to the rest of their enterprises. In another example, embodiments of the present disclosure provide for richer, more comprehensive documentation and learning materials for answering the plurality of different user questions that may arise. In still another example, unlike existing screen guide libraries that can only deliver tutorials within a single application or technology, embodiments of the present disclosure use RPA to automatically generate and deliver cross-application and cross-technology tutorials (e.g., tutorials and documentation that span multiple different applications, technologies, or both). As a result of these and other embodiments described herein, the expert knowledge captured within an RPA bot can be more easily shared with, understood by, and re-used by a broader user base.

FIG. 1 is a block diagram of a computing environment 100 that includes an electronic documentation generation system 102 for automatically generating and delivering electronic documentation data, including interactive documentation data, based on RPA data 112 associated with an RPA bot, according to some embodiments. Computing environment 100 can include a local network environment that includes electronic documentation generation system 102. In some embodiments, electronic documentation generation system 102 may include a memory and at least one processor coupled to the memory and configured to perform the functions described herein.

In some embodiments, electronic documentation generation system 102 can be implemented on, or using, computing device 104 (e.g., a user's personal computer, laptop, tablet, smartphone, or other computing device). For example, electronic documentation generation system 102 can be implemented on computing device 104 without network connectivity. In another example, electronic documentation generation system 102 can be implemented on computing device 104 with network connectivity to an external network, remote server, remote database, or any other suitable network or device. In yet another example, some or all tasks performed by one or more RPA bots (e.g., RPA bot 120, RPA bot 130, or the RPA bot associated with RPA data 112) included in electronic documentation generation system 102 may reside on computing device 104 without requiring external network connectivity to generate and deliver electronic documentation data and perform other functions described herein.

In some embodiments, electronic documentation generation system 102 may be configured to perform one or more of the operations and techniques described herein, or a combination thereof, in an automatic mode for electronic documentation generation. For example, in the automatic electronic documentation generation mode, electronic documentation generation system 102 may be configured to execute one or more of the electronic documentation generation operations and techniques described herein, or a combination thereof, automatically and without user interaction.

In some embodiments, electronic documentation generation system 102 may be configured to perform one or more of the operations and techniques described herein, or a combination thereof, in an interactive mode for electronic documentation generation. For example, in the interactive electronic documentation generation mode, electronic documentation generation system 102 may be configured to execute one or more of the electronic documentation generation operations and techniques described herein, or a combination thereof, with user interaction. For instance, the user could use a user input/output device to configure certain settings, such as to define how the electronic documentation data should be presented to the user (e.g., UI theming, etc.). Electronic documentation generation system 102 may also provide the user with the capability to use the user input/output device to provide additional textual descriptions to the steps. In one example, in a case where RPA data 112 contains suitable (e.g., very good) descriptions of the elements, electronic documentation generation system 102 may generate electronic documentation data that includes those textual description of the elements. In another example, in a case where RPA data 112 contains unsuitable (e.g., not very good) descriptions of the elements, electronic documentation generation system 102 may generate electronic documentation data that includes something like "Click on the Validate button" as the step description. Electronic documentation generation system 102 then may provide the user with the capability to provide user-defined descriptions (e.g., to define their own descriptions), such as something like "To ensure that the data has been entered correctly and is compliant with the company policies, please click the Validate button."

Electronic documentation generation system 102 may be configured to receive (e.g., through an application programming interface (API)) RPA data 112 (e.g., an RPA bot definition and screen data for a set of captured screens) associated with an RPA bot configured to automate one or more computer-implemented processes, tasks, or actions. RPA data 112 may include, for example: a set of functions; a set of electronic elements; a set of electronic element descriptions; a set of electronic definitions (e.g., flow definitions); a set of captured screens (e.g., screenshots); data collected from one or more systems, applications, or databases; aggregated data; generated data; data flow; actions; element criteria and descriptions; any other suitable data or electronic information; or any combination thereof for automating one or more computer-implemented processes, tasks, or actions.

In one illustrative and non-limiting example, electronic documentation generation system 102 can retrieve and store RPA data 112 in response to receiving a request for electronic documentation data (e.g., a request for a tutorial). In this example, electronic documentation generation system 102 can have access to several bot definitions and screen data and can use a machine learning algorithm to analyze that data and identify (e.g., detect) the relevant data that electronic documentation generation system 102 can use to generate the electronic documentation data or other documentation based on the event that triggered the electronic documentation generation request.

In another illustrative and non-limiting example, electronic documentation generation system 102 can receive (e.g., from another RPA bot or another device) a "generate documentation" API call with RPA data 112 as the input. For instance, a user can use a user input/output device to click the "Record" button (e.g., provided as part of the standard RPA software for the RPA bot creation), perform several UI actions (e.g., data input, click button, navigate), and generate an RPA bot definition based thereon. Thereafter, the user could click a button that indicates "now generate a tutorial from the steps I've just done so that I can give it to my students to teach them how to do it." Then electronic documentation generation system 102 can call the "generate documentation" API with the recorded RPA bot definition as the input and generate RPA bot 120 based on that input. RPA bot 120 can be the used to teach other people to do what the original bot creator did (e.g., RPA bot 120 will say "click on this button, will wait until the user performed the click, then say input data here," and so on).

In some embodiments, electronic documentation generation system 102 may be configured to generate modified RPA data based on RPA data 112. For example, where RPA data 112 comprises a function, electronic documentation generation system 102 may be configured to generate modified RPA data comprising a modified function corresponding to a modified version of the function included in RPA data 112. In another example, RPA data 112 may include a first set of functions to be executed across multiple different applications, and electronic documentation generation system 102 may be configured to generate modified RPA data comprising a second set of functions based on the first set of functions. At least one function in the second set of functions may be, for example, a modified version of a function included in the first set of functions. Illustratively, the first set of functions may include a first function configured to click automatically a link included in an email message, and a second function configured to input automatically textual data in a spreadsheet. The second set of functions may include a first modified function for guiding a user to click the link included in the email message, and a second modified function for guiding the user to input the textual data in the spreadsheet. Alternatively, the second set of functions may include the second modified function together with the first function in unmodified form, or vice versa.

In some embodiments, electronic documentation generation system 102 may be configured to generate electronic documentation data based on the modified RPA data. The electronic documentation data can include data for interactively navigating a user through the performance of one or more functions included in one or more computer-implemented processes, tasks, or actions previously configured to be automated by the RPA bot associated with RPA data 112, providing interactive inline help, or generating offline textual and visual documentation as discussed in further detail below. In one illustrative and non-limiting example, the electronic documentation data can include UI data, and the UI data can include interactive UI content.

In some embodiments, electronic documentation generation system 102 may be configured to obtain, retrieve, or otherwise receive RPA data 112, generate modified RPA data, and generate electronic documentation data in response to electronic documentation generation system 102 determining that the RPA bot associated with RPA data 112 has been loaded onto computing device 104 (e.g., each time an RPA bot is stored on, or in association with, computing device 104).

In yet other embodiments, electronic documentation generation system 102 may be configured to obtain, retrieve, or otherwise receive RPA data 112, generate modified RPA data, and generate electronic documentation data in response to electronic documentation generation system 102 receiving user input indicating a user's desire for a tutorial on the computer-implemented process associated with the RPA bot associated with RPA data 112, such as a user clicking on an "Activate Guided Tutorial" button, an "Activate Inline Help" button, a "Help" or "?" button, a "More Info" or "i" button, any other suitable button, or any combination thereof; uttering any voice command or making any gesture command associated therewith; or any combination thereof. The term "button" is to be understood broadly to encompass one or more physical buttons (including, but not limited to, keyboard keys and mouse buttons), electronic buttons, virtual buttons, soft buttons, touchscreen areas, augmented reality (AR) buttons, virtual reality (VR) buttons, any other suitable buttons, or any combination thereof.

In still other embodiments, electronic documentation generation system 102 may be configured to obtain, retrieve, or otherwise receive RPA data 112, generate modified RPA data, and generate electronic documentation data in response to electronic documentation generation system 102 determining that user behavior data for a particular user or type of user indicates a need for a tutorial (e.g., the user is a new employee, from a non-technical department, or is taking too long to perform tasks, performing indecisive or "back-and-forth" cursor movement, or any other user behavior indicative that a tutorial may be needed). For example, electronic documentation generation system 102 may contain, or be in communication with, a user behavior monitoring bot configured to generate user behavior data and transmit the user behavior data to electronic documentation generation system 102. Electronic documentation generation system 102 may receive the user behavior data from the user behavior monitoring bot, compare the user behavior data to a set of user behavior threshold values indicative of user technical proficiency, and determine that the user behavior data indicates a need for a tutorial in response to determining that the user behavior data falls below one or more of the set of user behavior threshold values.

In some embodiments, electronic documentation generation system 102 may be configured to generate another RPA bot based on the electronic documentation data, such as RPA bot 120, RPA bot 130, any other suitable bot, or any combination thereof. In some embodiments, electronic documentation generation system 102 may be configured to generate structured documentation data 140 based on the electronic documentation data.

As indicated by arrow 114, electronic documentation generation system 102 may be configured to generate RPA bot 120 and interactive screen guide data 122 associated with RPA bot 120 based on the electronic documentation data. RPA bot 120 may be, for example, an RPA guide bot configured to guide interactively a user through the performance of one or more functions included in one or more computer-implemented processes, tasks, or actions previously configured to be automated by the RPA bot associated with RPA data 112. For example, RPA bot 120 may be configured to instruct users to perform the steps of the computer-implemented process of the RPA bot associated with RPA data 112 using the screens and actions defined in RPA data 112. Once RPA bot 120 has been generated by electronic documentation generation system 102, users can utilize RPA bot 120 to guide them through the computer-implemented process or to provide interactive documentation for the RPA bot associated with RPA data 112.

In some embodiments, during execution, RPA bot 120 may be configured to highlight the corresponding UI element for one or more steps and display a textual description for that step. Electronic documentation generation system 102 may be configured to generate the textual step description from RPA data 112 and adjust the textual step description if needed. For example, if the RPA bot associated with RPA data 112 recorded a button click (e.g., as illustrated in screenshot 200 shown in FIG. 2A), then RPA bot 120 can highlight this button and instruct (e.g., by displaying a display screen overlay comprising the textual step description, or by outputting an audio signal comprising a text-to-speech version of the textual step description) a user that the user needs to click the button or otherwise perform the action as the next step of the process (e.g., as illustrated in screenshot 220 shown in FIG. 2B).

In some embodiments, electronic documentation generation system 102 may be configured to generate RPA bot 120 and interactive screen guide data 122 by determining which event each action included in RPA data 112 produces if executed by the RPA bot associated with RPA data 112 and then converting each UI "Action" statement or function included in RPA data 112 for execution by the RPA bot associated with RPA data 112 to a UI "Wait for Event" statement or function included in interactive screen guide data 122 for execution by RPA bot 120. To do so, electronic documentation generation system 102 may be configured to.

In an illustrative and non-limiting example, RPA data 112 can include statements and functions for use in instructing the RPA bot associated with RPA data 112 to execute automatically a "click( )" action according to following example pseudocode:

```
RPAbot.pIPRAProjects.wait(function(ev) {
    RPAbot.pIRPAProjects.btNewProject.click( );
    sc.endStep( ); //pIRPANewProject_management
    return;
});
```

Figure 2A:
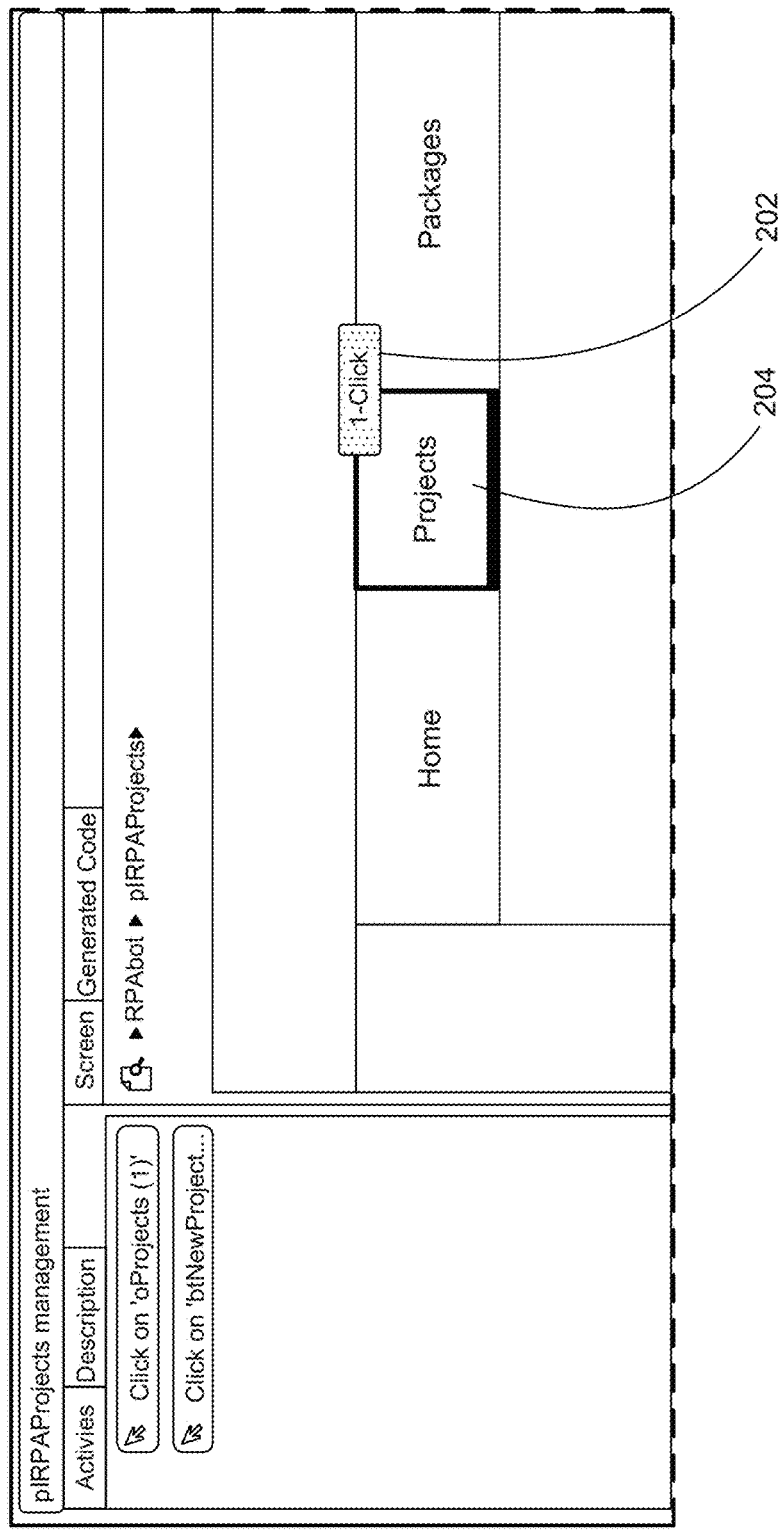
FIGS. 2A and 2B are illustrative representations of interactive screen guide display screens, according to some embodiments.

The above pseudocode may be configured to perform click 202 on "Projects" button 204 of screenshot 200 as shown in FIG. 2A.

Electronic documentation generation system 102 can generate modified RPA data by converting the above "click( )" action to a "wait for CLICK" event according to following example pseudocode:

```
RPAbot.pIPRAHome.wait(function(ev) {
    RPAbot.pIRPAHome.oProjects.events.CLICK.on
        (function ( ) {
        navigateToStep(MyCurrentStepNumber+1);
        sc.endStep( ); //pIRPAProjects_management
        return;
    });
});
```

Figure 2B:
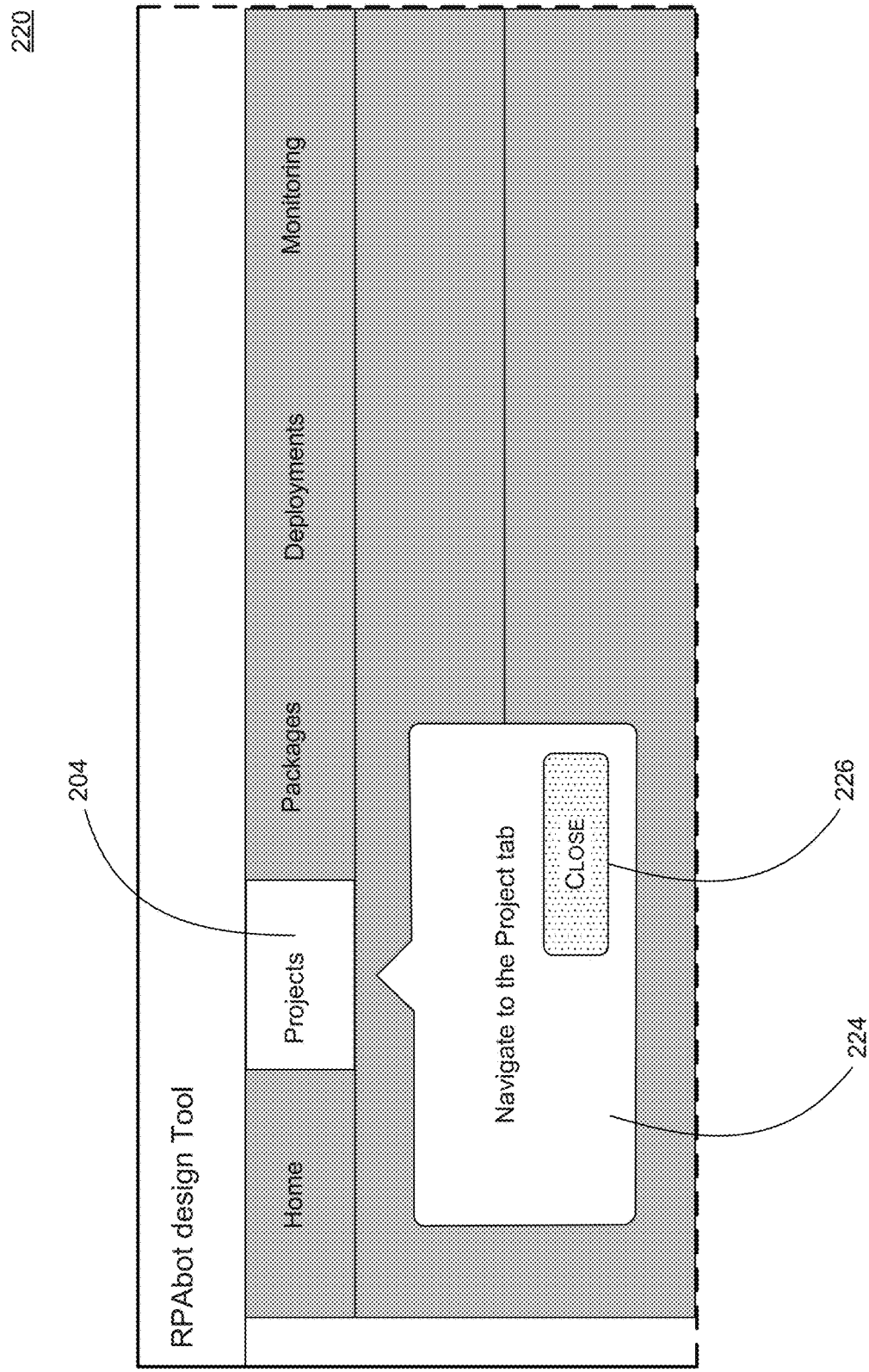

The above pseudocode may be configured to guide the user to navigate to and click on "Projects" button 204 by highlighting "Projects" button 204 and generating and displaying a "Navigate to the Project tab" display screen overlay 224 as shown in FIG. 2B.

Once RPA bot 120 has detected the "wait for CLICK" event, RPA bot 120 may move the tutorial forward one step. In some embodiments, the "navigateToStep(MyCurrentStepNumber+1)" function can be either auto-generated (e.g., by electronic documentation generation system 102 or RPA bot 120) or delivered as a library.

In some embodiments, RPA bot 120 may be configured to generate a navigational UI that displays the documentation for one or more steps. For web-based applications and computer-implemented processes, RPA bot 120 can dynamically modify the website html and inject (e.g., by utilizing "insertHtml" and "injectFunction" functionalities) the necessary html and scripting to highlight buttons and other screen elements and to display the corresponding textual step descriptions.

Figure 3A:
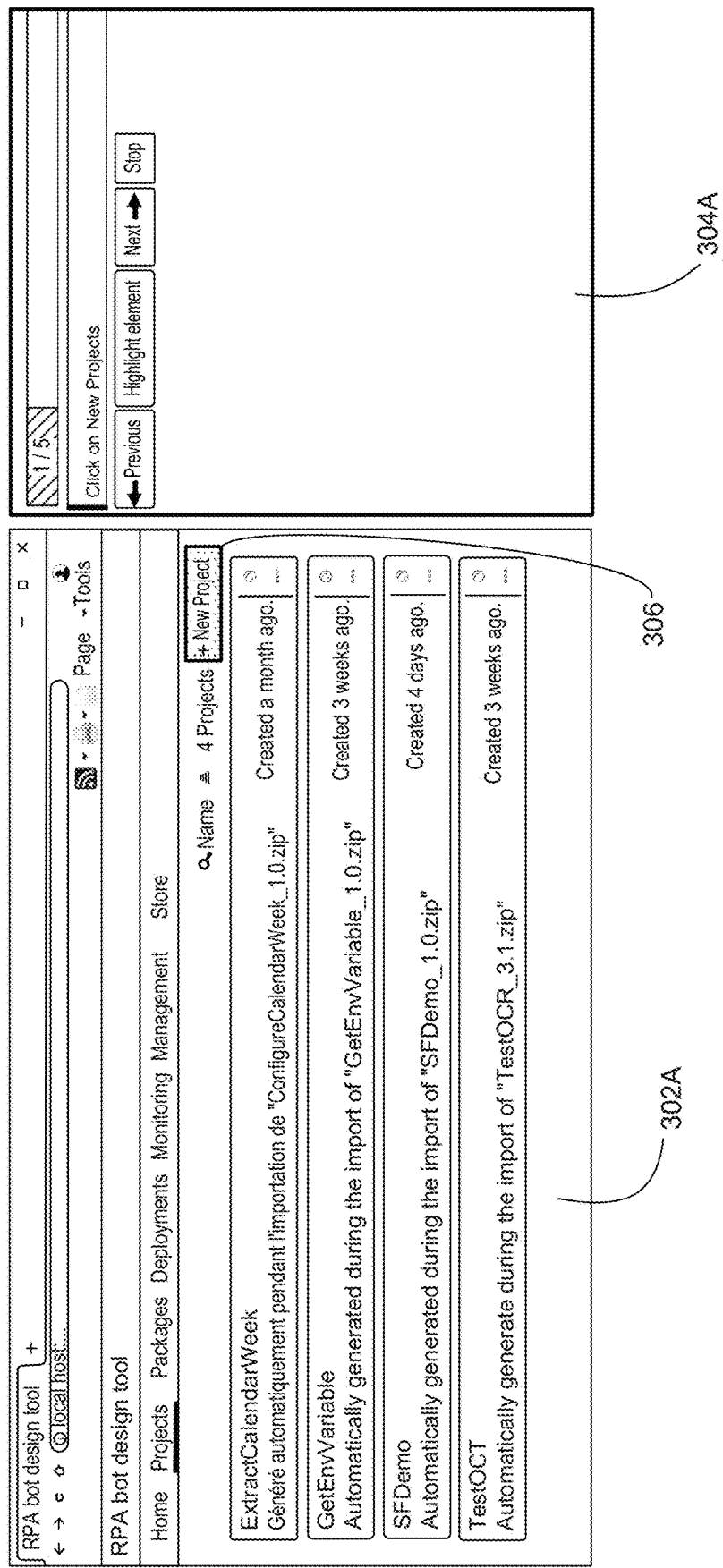
FIGS. 3A and 3B are illustrative representations of hybrid interactive screen guide display screens having mixed automation and navigation modes, according to some embodiments.
Figure 3B:
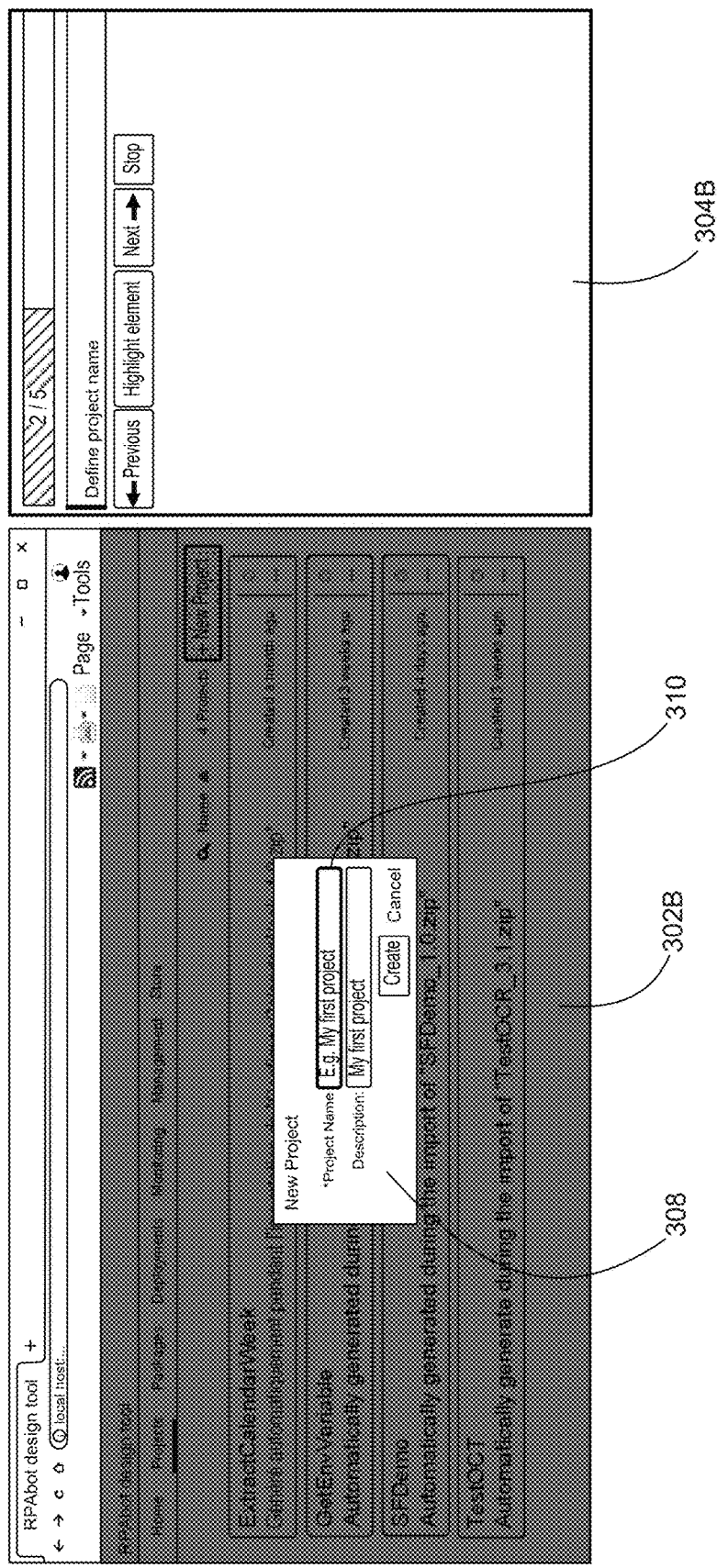

In embodiments where the RPA bot associated with RPA data 112 spans across different applications and different UI technologies, RPA bot 120 can provide cross-application support by generating a custom navigational UI that is configured to be displayed in a dialog element that can be placed in or moved to any suitable location (e.g., dragged by a user using a user input/output device), such as near the side bar, on a display device connected to computing device 104 (e.g., as shown in FIGS. 3A and 3B). The content of the dialog element may change based on the current user context. RPA bot 120 can use this custom navigational UI to display the steps of the process, highlight the UI elements for one or more steps, and provide textual step descriptions.

In some embodiments, RPA bot 120 can generate and deliver cross-technology tutorials that span across multiple different applications. For example, RPA bot 120 can combine actions performed in a spreadsheet application, a graphical user interface (GUI) application (e.g., a GUI client), and an enterprise resource planning (ERP) system in one single tutorial.

In some embodiments, RPA bot 120 provides guide bot design functionality as a native module with the corresponding activities, allowing users to utilize RPA bot 120 directly in the automation design. Such functionality can be used to mix automation and guiding modes, for example, to guide a user through some steps while executing the other steps automatically. For example, RPA bot 120 may react to an incoming email automatically and navigate to a screen in an ERP system. Subsequently, RPA bot 120 may pause and highlight the input field where RPA bot 120 may expect user input. Once the user has provided the user input, RPA bot 120 may continue the execution of the computer-implemented process.

As indicated by arrow 116, electronic documentation generation system 102 may be configured to generate RPA bot 130 and interactive element-based documentation data 132 (e.g., interactive inline contextual user help documentation data) associated with RPA bot 130 based on the electronic documentation data. RPA bot 130 may be, for example, an RPA inline help bot configured to generate interactive element-based documentation data 132 based on captured RPA screens. For example, the RPA bot associated with RPA data 112 may be configured to identify various UI elements based on specific criteria and optional "documentation" parameters for each identified screen element and store that data as structured data in RPA data 112. As a result, the RPA bot associated with RPA data 112 may be configured to recognize these elements at runtime. In one example, by publishing screens with the element criteria in RPA data 112, those screens become available and can be used (e.g., by electronic documentation generation system 102, RPA bot 130, or both) to deliver interactive help attached to the screen elements.

Figure 4:
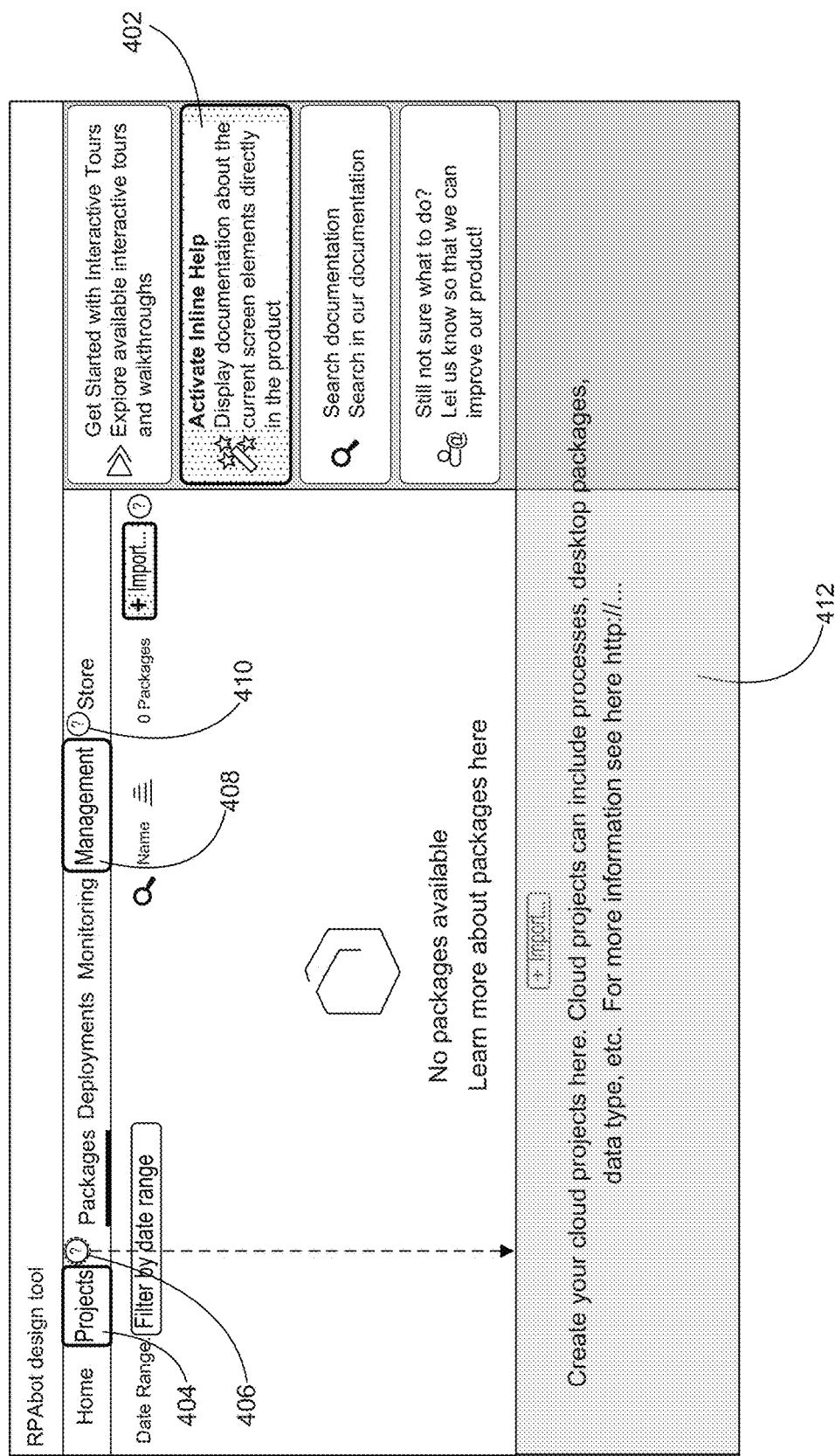
FIG. 4 is an illustrative representation of an interactive element-based documentation display screen, according to some embodiments.

In some embodiments, RPA content providers, such as ERP systems, can deliver their screens in an RPA store. For example, the RPA bot associated with RPA data 112 can include electronic data associated with its screens in RPA data 112. Electronic documentation generation system 102 then can generate RPA bot 130 based on these screens and execute RPA bot 130 in attended mode to provide inline help about the screen elements. For example, RPA bot 130 may have a switch that says "Activate Inline Help" (e.g., as shown in FIG. 4). In response to a user activating the switch, RPA bot 130 may highlight all elements in the current screen for which the documentation parameter has been filled. Subsequently, if a user selects a highlighted element, RPA bot 130 may display the corresponding documentation to the user.

In some embodiments, for web-based applications and computer-implemented processes, RPA bot 130 can dynamically modify the website html and inject (e.g., by utilizing "insertHtml" and "injectFunction" functionalities) the necessary html and scripting to highlight buttons and other screen elements and to display the corresponding textual step descriptions.

In embodiments where the RPA bot associated with RPA data 112 spans across different applications and different UI technologies, RPA bot 130 can provide cross-application support by generating a custom inline help UI that is configured to be displayed in a dialog element that can be placed in any suitable location, such as in or near the side bar on a display device connected to computing device 104. The content of the dialog element may change based on the current user context. RPA bot 130 can use this custom inline help UI to display inline help documentation for the steps of the process, highlight the UI elements for one or more steps, and provide textual step descriptions.

In some embodiments, RPA bot 130 can generate and deliver cross-technology inline help that spans across multiple different applications. For example, RPA bot 130 can combine actions performed in a spreadsheet application, a GUI application (e.g., a GUI client), and an ERP system in one single inline help process.

As indicated by arrow 118, electronic documentation generation system 102 may be configured to generate structured documentation data 140 (e.g., offline, printable process documentation for the RPA bot associated with RPA data 112 in the form of a portable document format (pdf) document) based on the electronic documentation data. Structured documentation data 140 may include, for example, textual process documentation data (e.g., textual step descriptions) and visual process documentation data (e.g., visual step descriptions such as screenshots and annotated screenshots) for one or more steps of the computer-implemented process associated with the RPA bot associated with RPA data 112. In some embodiments, electronic documentation generation system 102 may store structured documentation data 140 locally in computing device 104 for offline access, viewing, and printing.

In some embodiments, electronic documentation generation system 102 may generate structured documentation data 140 by converting each workflow step of the RPA bot associated with RPA data 112 to a corresponding textual description and adding corresponding screenshots to illustrate the actions in the steps. Structured documentation data 140 then can be used, for example, to onboard new employees, or as an input for process optimization. In addition, unlike the original bot design for the RPA bot associated with RPA data 112, the generated structured documentation data 140 does not require any RPA software to be installed on computing device 104 for the user to be able to use structured documentation data 140.

FIGS. 2A and 2B are illustrative representations of interactive screen guide display screens, according to some embodiments. As shown in FIG. 2A, screenshot 200 illustrates the script (e.g., obtained, retrieved, or otherwise received by electronic documentation generation system 102) of a click action defined in RPA data 112. The click action may be configured to perform click 202 on "Projects" button 204. As shown in FIG. 2B, screenshot 220 illustrates the modified script (e.g., generated by electronic documentation generation system 102) of a modified click action in RPA bot 120 (e.g., in interactive screen guide data 122). The modified click action may be configured to guide a user to navigate to and click on "Projects" button 204 by highlighting "Projects" button 204 (e.g., by darkening or shading portions of screenshot 220 other than "Projects" button 204 as shown in FIG. 2B; or by adding a colored line, such as a thick red line, around "Projects" button 204) and generating and displaying a "Navigate to the Project tab" display screen overlay 224 in association with a "CLOSE" button 226. In some embodiments, "CLOSE" button 226, when clicked by a user, may be configured to remove the highlighting from "Projects" button 204 and further to remove "Navigate to the Project tab" display screen overlay 224.

FIGS. 3A and 3B are illustrative representations of hybrid interactive screen guide display screens having mixed automation and navigation modes, according to some embodiments. As shown in FIG. 3A, screenshot 300 includes application UI 302A and custom navigational UI 304A (e.g., step 1 of 5 ("1/5"), "Click on New Projects") that is displayed in a sidebar, separate window, pop-up display screen overlay, or according to any other suitable UI display technique. RPA bot 120 can use custom navigational UI 304A to display the steps of the computer-implemented process associated with application UI 302A (e.g., as defined by RPA data 112), highlight the UI element for one or more steps (including, but not limited to, each step), provide a textual step description for one or more steps (including, but not limited to, each step), or a combination thereof. For example, RPA bot 120 can highlight "+New Project" button 306 (e.g., by adding a colored line, such as a thick red line, around "+New Project" button 306 as shown in FIG. 3A; or by darkening or shading portions of screenshot 300 other than "+New Project" button 306).

As shown in FIG. 3B, during the next step of the computer-implemented process, screenshot 320 includes application UI 302B, custom navigational UI 304B (e.g., step 2 of 5 ("2/5"), "Define project name"), and "New Project" display screen overlay 308 that includes, among other features, "Project name" UI element 310. RPA bot 120 may generate and display screenshot 320 in response to the user clicking on "+New Project" button 306 shown in FIG. 3A. RPA bot 120 can use custom navigational UI 304B to display the steps of the computer-implemented process associated with application UI 302B (e.g., as defined by RPA data 112), highlight the UI element for one or more steps, provide a textual step description for one or more steps, or a combination thereof. For example, RPA bot 120 can highlight "Project name" UI element 310 (e.g., by adding a colored line, such as a thick red line, around "Project name" UI element 310 and darkening or shading portions of screenshot 320 other than "New Project" display screen overlay 308 as shown in FIG. 3B; or by darkening or shading portions of screenshot 320 other than "Project name" UI element 310).

In some embodiments, application UI 302A may correspond to a first application having a first UI technology, and application UI 302B may correspond to a second application having a second UI technology. In some embodiments, the second application may be different from the first application, the second UI technology may be different from the first UI technology, or a combination thereof.

FIG. 4 is an illustrative representation of an interactive element-based documentation display screen, according to some embodiments. As shown in FIG. 4, screenshot 400 includes "Activate Inline Help" button 402. In response to a user clicking "Activate Inline Help" button 402, RPA bot 130 may highlight all elements in the current screen for which the documentation parameter has been filled, such as "Projects" button 404 and "Management" button 408. For example, RPA bot 130 may highlight "Projects" button 404 by adding a colored line, such as a light blue line, around "Projects" button 404 and adding "?" icon 406 near (e.g., slightly to the right of) "Projects" button 404. In another example, RPA bot 130 may highlight "Management" button 408 by adding a colored line, such as a light blue line, around "Management" button 408 and adding "?" icon 410 near "Management" button 408. In yet another example (not shown in FIG. 4), RPA bot 130 may highlight "Projects" button 404 and "Management" button 408 by darkening or shading portions of screenshot 400 other than "Projects" button 404, "Management" button 408, and, in some embodiments, "?" icon 406 and "?" icon 410.

Subsequently, in response to a user clicking "?" icon 406, RPA bot 130 may generate and display inline help display screen overlay 412 containing interactive element-based documentation data corresponding to "Projects" button 404 (e.g., a textual step description that states "Create your cloud projects here. Cloud projects can include processes, desktop packages, data type, etc. For more information see here http:// . . . "). Similarly, in response to a user clicking "?" icon 410, RPA bot 130 may generate and display an inline help display screen overlay containing interactive element-based documentation data corresponding to "Management" button 408.

FIGS. 5A, 5B, 5C, and 5D are illustrative representations of structured documentation data display screens associated with an RPA bot (e.g., the RPA bot associated with RPA data 112) that navigates through different screens to create an RPA project, according to some embodiments. For example, the RPA project can include definitions of an RPA bot application with three captured screens: screen 502, screen 504, and screen 506.

Figure 5A:
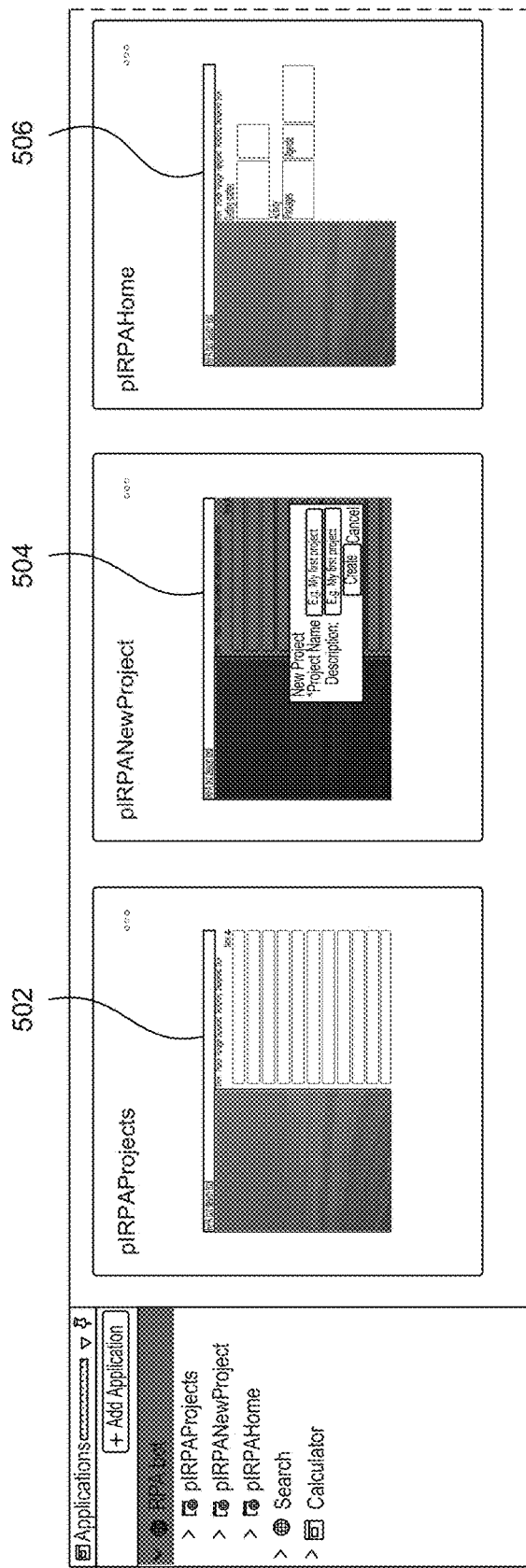
Figure 5B:
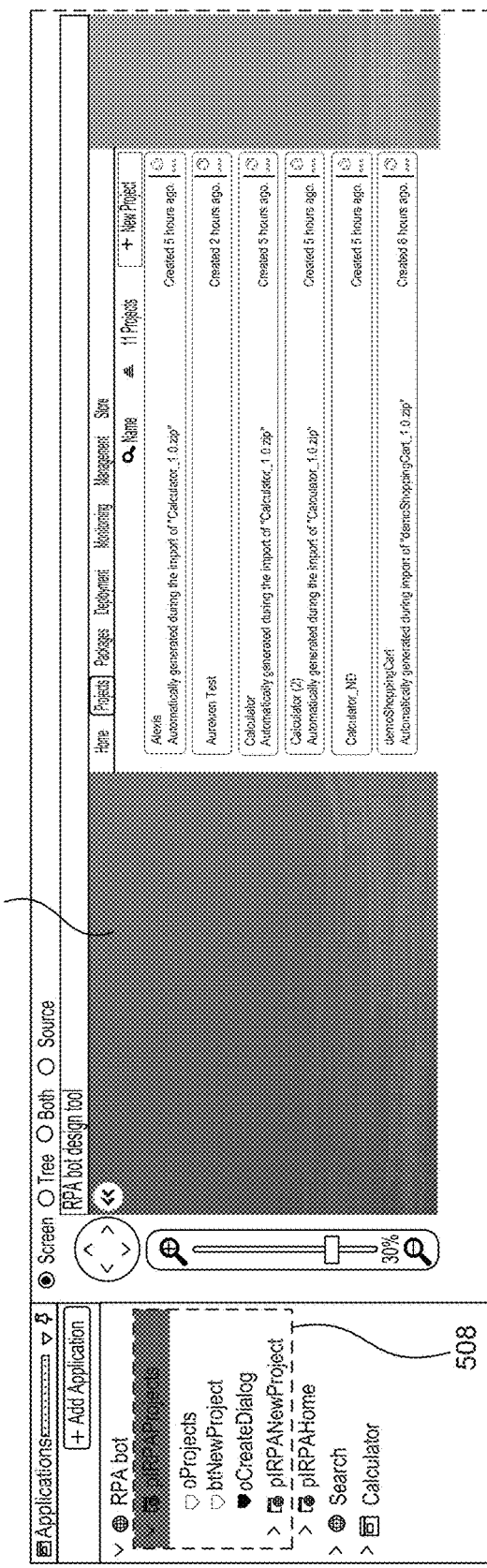
Figure 5C:
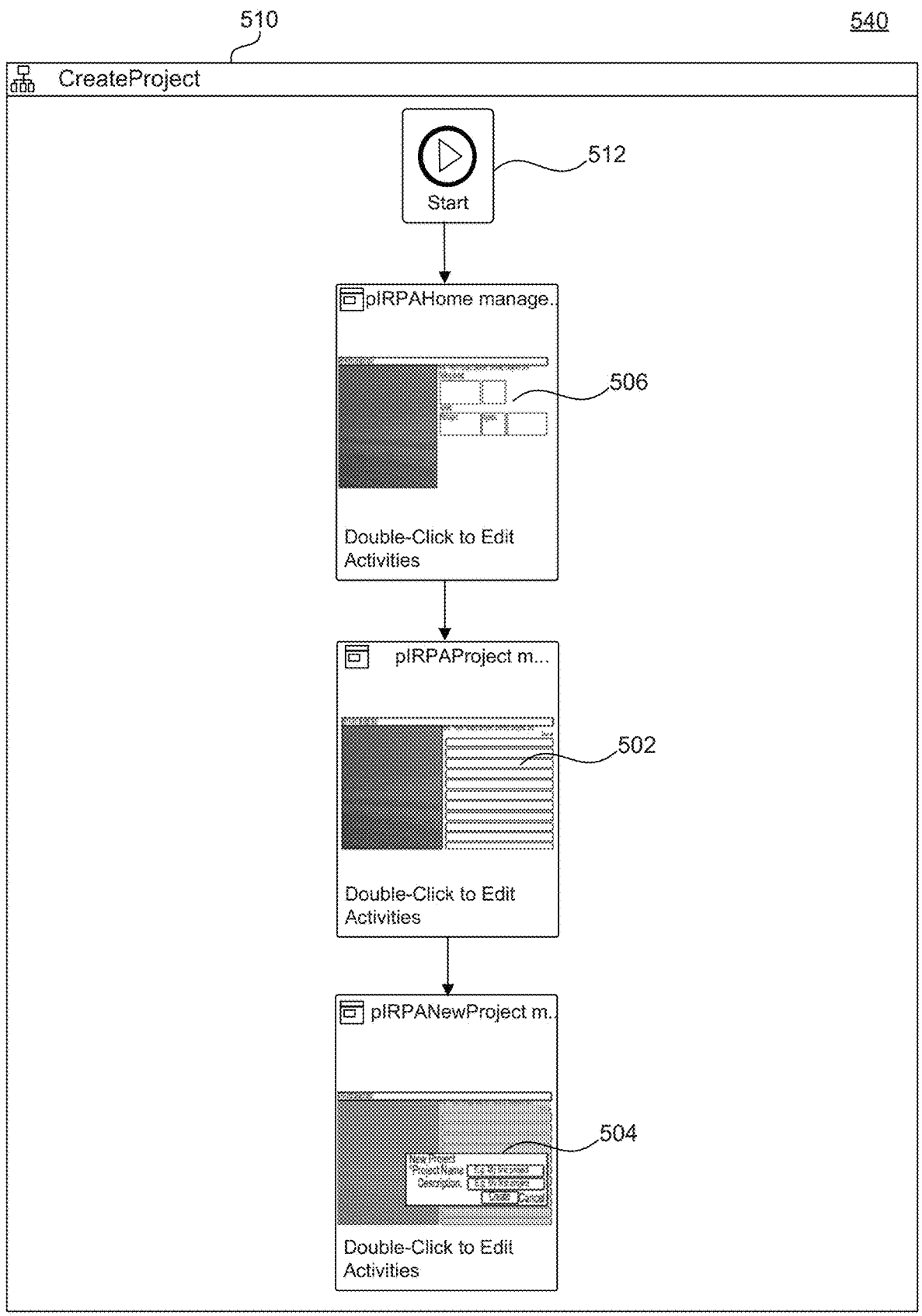

In some embodiments, electronic documentation generation system 102 may receive, as input, RPA data (e.g., RPA data 112) that includes screenshot 500, screenshot 520, and screenshot 540 shown in FIGS. 5A, 5B, and 5C, respectively. In some embodiments, electronic documentation generation system 102 may generate, based on the received RPA data or one or more portions thereof, electronic documentation data that, in one illustrative and non-limiting example, may resemble screenshot 560 shown in FIG. 5D.

As shown in FIG. 5A, screenshot 500 includes screen 502, screen 504, and screen 506. Each screen can contain several identified elements that the RPA bot may need to access for this scenario. For example, as shown in FIG. 5B, screenshot 520 includes identified elements 508 (e.g., "pIRPAProjects," "oProjects," "btNewProject," "oCreateDialog," and "pIR-PANewProject") displayed in association with screen 502. As shown in FIG. 5C, screenshot 540 includes "CreateProject" workflow 510 that defines UI interactions, such as "Start" action 512, screen 506, screen 502, and screen 504. These interactions are converted to JavaScript, which is then executed by an agent.

Figure 5D:
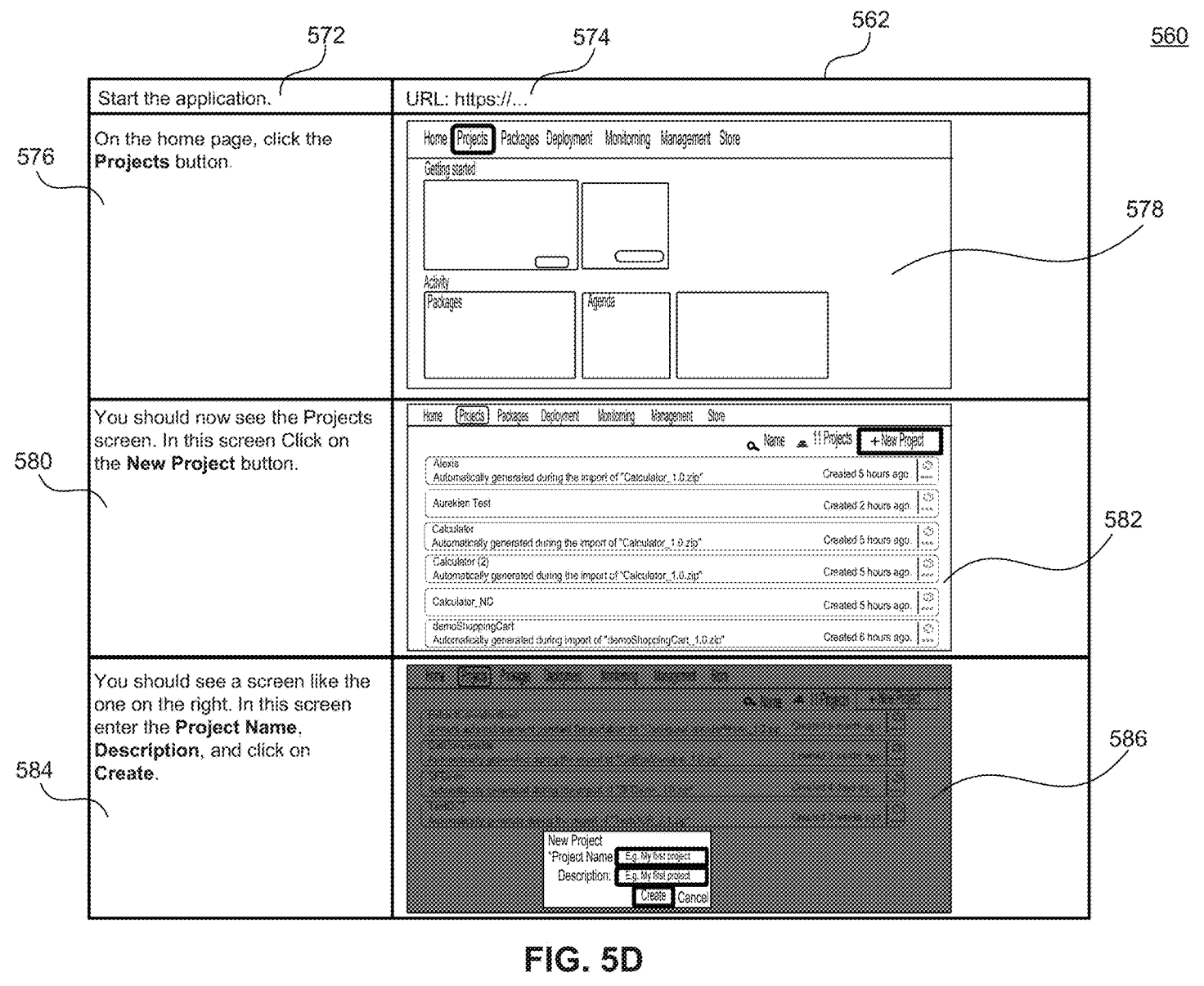

As shown in FIG. 5D, screenshot 560 includes process documentation 562 (e.g., offline user tutorials) that has been automatically generated (e.g., by electronic documentation generation system 102) based on the above data, functions, and electronic information. For example, the RPA bot definition may contain all necessary screenshots and workflow steps (e.g., in RPA data 112). Electronic documentation generation system 102 can utilize an electronic documentation generation algorithm or technique to convert this data and electronic information into a structured document (e.g., structured documentation data 140) that can be distributed to users (e.g., for local storage on computing device 104) and used as process documentation material. For example, this process can be converted to process documentation 562, which can include, for example, textual process documentation data 572 (e.g., "Start the application."), textual process documentation data 574 (e.g., "URL: https:// . . . "), textual process documentation data 576 (e.g., "On the home page, click the Projects button."), visual process documentation data 578 (e.g., a modified version of screen 506), textual process documentation data 580 (e.g., "You should now see the Projects screen. In this screen Click on the New Project button."), visual process documentation data 582 (e.g., a modified version of screen 502), textual process documentation data 584 (e.g., "You should see a screen like the one on the right. In this screen enter the Project Name, Description, and click on Create."), visual process documentation data 586 (e.g., a modified version of screen 504), any other suitable data (e.g., textual, visual, audio), or any combination thereof.

Figure 6:
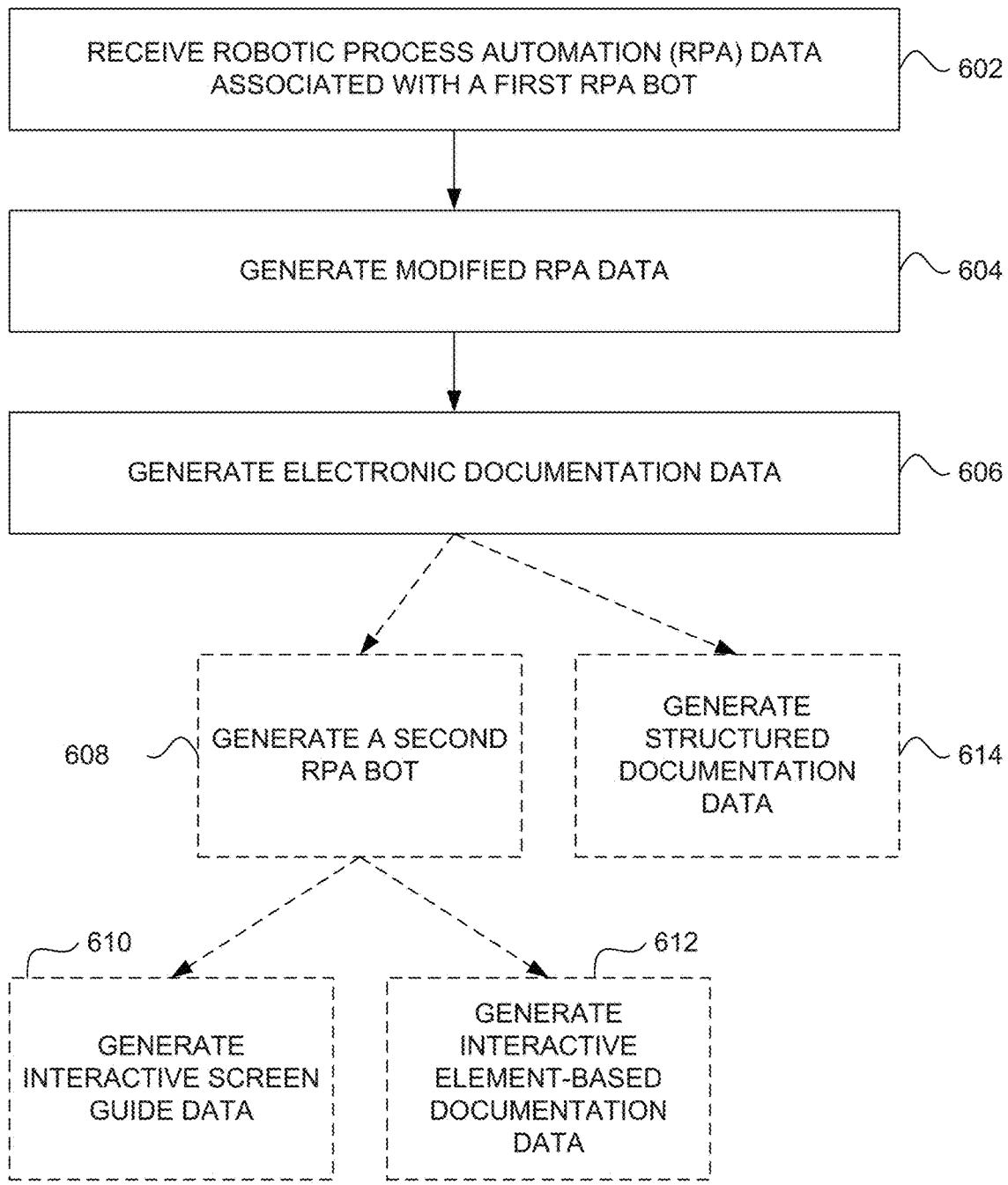
FIG. 6 is a flowchart illustrating a process for generating electronic documentation data, according to some embodiments.

FIG. 6 is a flowchart for a method 600 for generating electronic documentation data based on RPA data associated with an RPA bot. Method 600 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 6, as will be understood by a person of ordinary skill in the art.

Method 600 shall be described with reference to FIG. 1. However, method 600 is not limited to that example embodiment.

In 602, electronic documentation generation system 102 receives RPA data associated with a first RPA bot. For example, the received RPA data can include RPA data 112 associated with an RPA bot. In some embodiments, electronic documentation generation system 102 may receive or obtain the RPA data (e.g., based on user behavior data).

In 604, electronic documentation generation system 102 generates modified RPA data based on the received RPA data. In an embodiment, 604 can be implemented according to the example pseudocode described with reference to FIG. 1 (e.g., converting a "click( )" action to a "wait for CLICK" event). However, in other embodiments, 604 can be implemented using other code, pseudocode, algorithms, modification factors, or combinations thereof.

In 606, electronic documentation generation system 102 generates electronic documentation data based on the modified RPA data. In one example, the electronic documentation data can include data for interactively navigating a user through the performance of one or more functions included in one or more computer-implemented processes, tasks, or actions previously configured to be automated by the first RPA bot. In another example, the electronic documentation data can include data for providing interactive inline help. In yet another example, the electronic documentation data can include data for generating offline textual and visual documentation.

Optionally, in 608, electronic documentation generation system 102 may generate a second RPA bot based on the electronic documentation data. In one example, the second RPA bot may be an RPA guide bot (e.g., RPA bot 120). In another example, the second RPA bot may be an RPA inline help bot (e.g., RPA bot 130).

Optionally, in 610, electronic documentation generation system 102 may generate interactive screen guide data associated with the second RPA bot and based on the electronic documentation data. For example, the interactive screen guide data may include interactive screen guide data 122 associated with RPA bot 120.

Optionally, in 612, electronic documentation generation system 102 may generate interactive element-based documentation data associated with the second RPA bot and based on the electronic documentation data. For example, the interactive element-based documentation data may include interactive element-based documentation data 132 associated with RPA bot 130.

Optionally, in 614, electronic documentation generation system 102 may generate structured documentation data based on the electronic documentation data. For example, the structured documentation data may include structured documentation data 140. In another example, the structured documentation data may include textual process documentation data and visual process documentation data.

Figure 7:
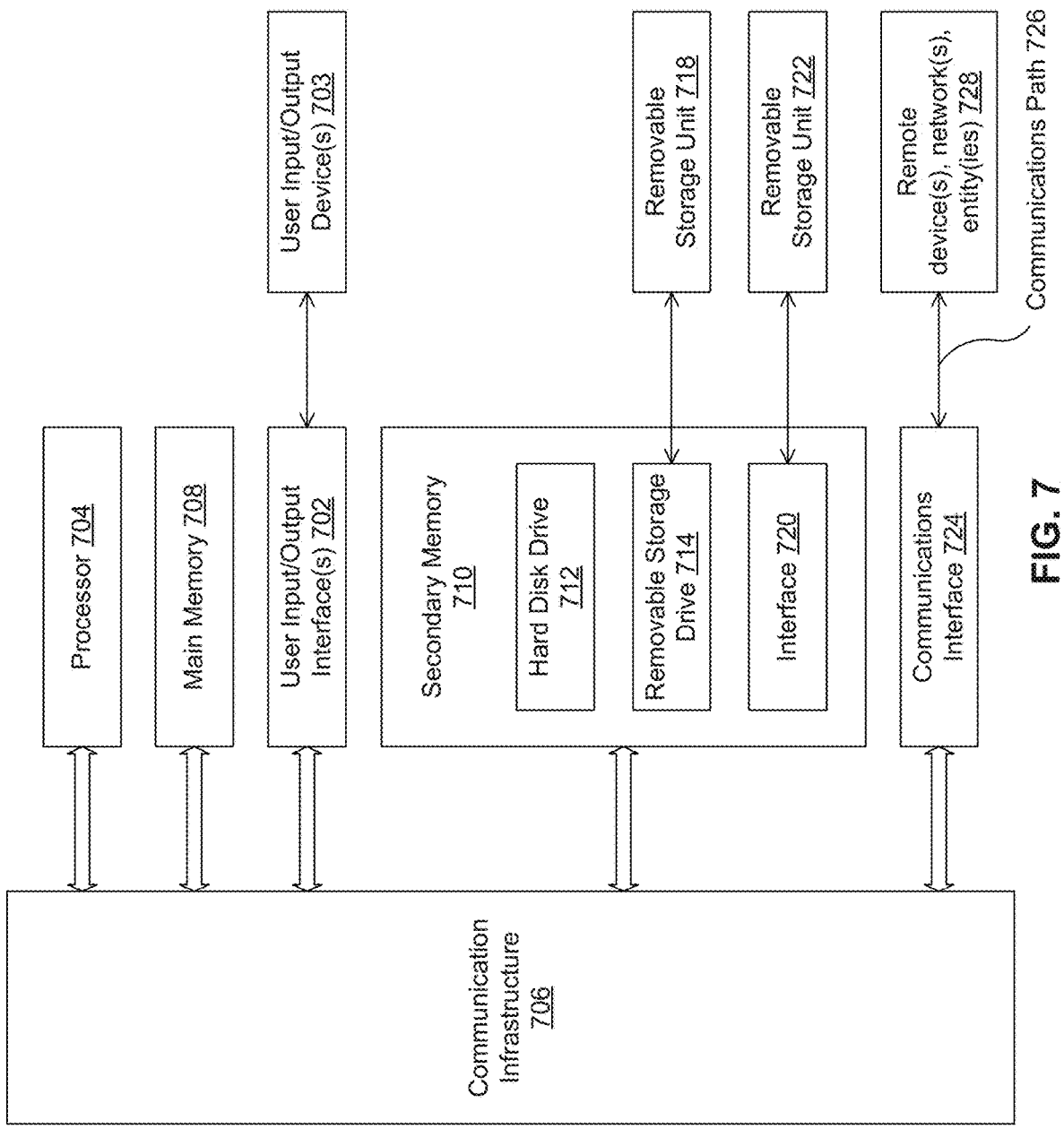
FIG. 7 is an example computer system useful for implementing various embodiments.

Various embodiments may be implemented, for example, using one or more well-known computer systems, such as computer system 700 shown in FIG. 7. One or more computer systems 700 may be used, for example, to implement any of the embodiments discussed herein, as well as combinations and sub-combinations thereof.

Computer system 700 may include one or more processors (also called central processing units, or CPUs), such as a processor 704. Processor 704 may be connected to a communication infrastructure or bus 706.

Computer system 700 may also include user input/output device(s) 703, such as monitors, keyboards, pointing devices, etc., which may communicate with communication infrastructure 706 through user input/output interface(s) 702.

One or more of processors 704 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 700 may also include a main or primary memory 708, such as random access memory (RAM). Main memory 708 may include one or more levels of cache. Main memory 708 may have stored therein control logic (i.e., computer software) and/or data.

Computer system 700 may also include one or more secondary storage devices or memory 710. Secondary memory 710 may include, for example, a hard disk drive 712 and/or a removable storage device or drive 714. Removable storage drive 714 may be a floppy disk drive, a magnetic tape drive, a compact disk drive, an optical storage device, tape backup device, and/or any other storage device/drive.

Removable storage drive 714 may interact with a removable storage unit 718. Removable storage unit 718 may include a computer usable or readable storage device having stored thereon computer software (control logic) and/or data. Removable storage unit 718 may be a floppy disk, magnetic tape, compact disk, DVD, optical storage disk, and/any other computer data storage device. Removable storage drive 714 may read from and/or write to removable storage unit 718.

Secondary memory 710 may include other means, devices, components, instrumentalities or other approaches for allowing computer programs and/or other instructions and/or data to be accessed by computer system 700. Such means, devices, components, instrumentalities or other approaches may include, for example, a removable storage unit 722 and an interface 720. Examples of the removable storage unit 722 and the interface 720 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 700 may further include a communication or network interface 724. Communication interface 724 may enable computer system 700 to communicate and interact with any combination of external devices, external networks, external entities, etc. (individually and collectively referenced by reference number 728). For example, communication interface 724 may allow computer system 700 to communicate with external or remote devices 728 over communications path 726, which may be wired and/or wireless (or a combination thereof), and which may include any combination of LANs, WANs, the Internet, etc. Control logic and/or data may be transmitted to and from computer system 700 via communication path 726.

Computer system 700 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 700 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 700 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 700, main memory 708, secondary memory 710, and removable storage units 718 and 722, as well as tangible articles of manufacture embodying any combination of the foregoing. Such control logic, when executed by one or more data processing devices (such as computer system 700), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 7. In particular, embodiments can operate with software, hardware, and/or operating system implementations other than those described herein.

It is to be appreciated that the Detailed Description section, and not any other section, is intended to be used to interpret the claims. Other sections can set forth one or more but not all example embodiments as contemplated by the inventor(s), and thus, are not intended to limit this disclosure or the appended claims in any way.

While this disclosure describes example embodiments for example fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described example embodiments, but should be defined only in accordance with the following claims and their equivalents.

What is claimed is:

1. A computer implemented method for generating electronic documentation, comprising:
   receiving, by at least one processor, robotic process automation (RPA) data comprising workflow steps for a first RPA bot;
   generating, by the at least one processor, modified RPA data based on the RPA data;
   generating, by the at least one processor, electronic documentation data based on the modified RPA data in response to receiving user input indicative of a request for a tutorial on a computer-implemented process associated with the first RPA bot, wherein the electronic documentation data comprises a textual description of the modified RPA data;
   generating, by the at least one processor, a second RPA bot for the tutorial based on the electronic documentation data, wherein the second RPA bot is an RPA guide bot or an RPA inline help bot; and
   generating, by the at least one processor, based on the electronic documentation data, interactive screen guide data associated with the RPA guide bot or interactive element-based documentation data associated with the RPA inline help bot.

2. The method of claim 1, wherein the RPA data comprises a function, the generating the modified RPA data comprising:
   generating, by the at least one processor, a modified function based on the function,
   wherein the modified RPA data comprises the modified function.

3. The method of claim 1, further comprising: interactively navigating, by the at least one processor and based on the interactive screen guide data, a user through a performance of one or more functions included in one or more computer-implemented processes, tasks, or actions previously configured to be automated by the first RPA bot.

4. The method of claim 1, further comprising: generating, by the at least one processor, an interactive inline help user interface based on the interactive element-based documentation data.

5. The method of claim 1, wherein:
the method further comprises:
generating, by the at least one processor and based on the electronic documentation data, structured documentation data by, for each respective workflow step, performing operations comprising:
converting the respective workflow step to a corresponding textual description of the respective workflow step, and
adding a corresponding screenshot that illustrates an action in the respective workflow step; and
the structured documentation data is accessible offline.

6. The method of claim 5, wherein the structured documentation data comprises:
textual process documentation data indicative of the textual descriptions of the workflow steps; and
visual process documentation data indicative of the screenshots of the actions in the workflow steps.

7. A system, comprising:
a memory; and
at least one processor coupled to the memory and configured to:
receive robotic process automation (RPA) data comprising workflow steps for a first RPA bot;
generate modified RPA data based on the RPA data;
generate electronic documentation data based on the modified RPA data in response to receiving user input indicative of a request for a tutorial on a computer-implemented process associated with the first RPA bot, wherein the electronic documentation data comprises a textual description of the modified RPA data;
generate a second RPA bot for the tutorial based on the electronic documentation data, wherein the second RPA bot is an RPA guide bot or an RPA inline help bot; and
generate based on the electronic documentation data, interactive screen guide data associated with the RPA guide bot or interactive element-based documentation data associated with the RPA inline help bot.

8. The system of claim 7, wherein:
the RPA data comprises a function;
to generate the modified RPA data, the at least one processor is configured to generate a modified function based on the function; and
the modified RPA data comprises the modified function.

9. The system of claim 7, the at least one processor further configured to: interactively navigate, based on the interactive screen guide data, a user through a performance of one or more functions included in one or more computer-implemented processes, tasks, or actions previously configured to be automated by the first RPA bot.

10. The system of claim 7, the at least one processor further configured to: generate an interactive inline help user interface based on the interactive element-based documentation data.

11. The system of claim 7, wherein:
the at least one processor is further configured to:
generate, based on the electronic documentation data, structured documentation data based on the electronic documentation data by, for each respective workflow step, performing operations comprising:
converting the respective workflow step to a corresponding textual description of the respective workflow step, and
adding a corresponding screenshot that illustrates an action in the respective workflow step; and
the structured documentation data is accessible offline.

12. The system of claim 11, wherein the structured documentation data comprises:
textual process documentation data indicative of the textual descriptions of the workflow steps; and
visual process documentation data indicative of the screenshots of the actions in the workflow steps.

13. A non-transitory computer-readable medium having instructions stored thereon that, when executed by at least one computing device, cause the at least one computing device to perform operations comprising:
receiving robotic process automation (RPA) data comprising workflow steps for a first RPA bot;
generating modified RPA data based on the RPA data;
generating electronic documentation data based on the modified RPA data in response to receiving user input indicative of a request for a tutorial on a computer-implemented process associated with the first RPA bot, wherein the electronic documentation data comprises a textual description of the modified RPA data;
generating a second RPA bot for the tutorial based on the electronic documentation data, wherein the second RPA bot is an RPA guide bot or an RPA inline help bot; and
generating by the at least one processor, based on the electronic documentation data, interactive screen guide data associated with the RPA guide bot or interactive element-based documentation data associated with the RPA inline help bot.

14. The non-transitory computer-readable device of claim 13, wherein the RPA data comprises a function, the generating the modified RPA data comprising:
generating a modified function based on the function, wherein the modified RPA data comprises the modified function.

15. The non-transitory computer-readable device of claim 13, the operations further comprising: interactively navigating, based on the interactive screen guide data, a user through a performance of one or more functions included in one or more computer-implemented processes, tasks, or actions previously configured to be automated by the first RPA bot.

16. The non-transitory computer-readable device of claim 13, the operations further comprising: generating an interactive inline help user interface based on the interactive element-based documentation data.

17. The non-transitory computer-readable device of claim 13, wherein: the operations further comprise:
generating, based on the electronic documentation data, structured documentation data based on the electronic documentation data by, for each respective workflow step, performing operations comprising:
converting the respective workflow step to a corresponding textual description of the respective workflow step, and adding a corresponding screenshot that illustrates an action in the respective workflow step; and the structured documentation data is accessible offline.

\* \* \* \* \*